United States Patent
Lawes et al.

(10) Patent No.: US 12,261,333 B2
(45) Date of Patent: Mar. 25, 2025

(54) JUMP-STARTING A HYDROGEN FUEL CELL-POWERED AIRCRAFT

(71) Applicant: ZeroAvia, Ltd., Cirencester (GB)

(72) Inventors: Stephen Lawes, Cranfield (GB); Ritish Tejpal, Coventry (GB)

(73) Assignee: ZeroAvia Ltd., Cirencester (GB)

(*) Notice: Subject to any disclaimer, the term of this patent is extended or adjusted under 35 U.S.C. 154(b) by 224 days.

(21) Appl. No.: 17/657,624

(22) Filed: Mar. 31, 2022

(65) Prior Publication Data

US 2022/0336832 A1 Oct. 20, 2022

Related U.S. Application Data

(60) Provisional application No. 63/171,697, filed on Apr. 7, 2021.

(51) Int. Cl.
| | |
|---|---|
| *H01M 8/04302* | (2016.01) |
| *B60L 50/70* | (2019.01) |
| *H01M 8/04082* | (2016.01) |
| *H01M 8/04111* | (2016.01) |
| *H01M 8/2457* | (2016.01) |

(52) U.S. Cl.
CPC ......... *H01M 8/04302* (2016.02); *B60L 50/70* (2019.02); *H01M 8/04111* (2013.01); *H01M 8/04201* (2013.01); *H01M 8/2457* (2016.02); *B60L 2200/10* (2013.01)

(58) Field of Classification Search
CPC ......... H01M 8/04302; H01M 8/04111; H01M 8/04201; H01M 8/2457; H01M 8/04753; H01M 8/04089; H01M 8/04225; H01M 8/04776; H01M 8/04888; H01M 8/04552; H01M 8/04559; H01M 8/04873; H01M 8/0488; H01M 2250/20; H01M 16/006; B60L 50/70; B60L 2200/10; B60L 58/31
See application file for complete search history.

(56) References Cited

U.S. PATENT DOCUMENTS

| | | | | |
|---|---|---|---|---|
| 2005/0186454 A1* | 8/2005 | Clingerman | ...... | H01M 8/04089 429/432 |
| 2005/0211842 A1* | 9/2005 | Hoffjann | ...... | H01M 8/04731 244/119 |

(Continued)

FOREIGN PATENT DOCUMENTS

JP H11200888 * 7/1999

OTHER PUBLICATIONS

Bradley et al., "Development and experimental characterization of a fuel cell powered aircraft," 2007, Journal of Power Sources, 171, 793-801. (Year: 2007).*

(Continued)

*Primary Examiner* — Matthew W Van Oudenaren
(74) *Attorney, Agent, or Firm* — Osha Bergman Watanabe & Burton LLP

(57) ABSTRACT

A method for jump-starting a hydrogen fuel cell-powered aircraft is disclosed. The method accesses a fuel cell stack containing latent oxygen therein. Accesses a hydrogen fuel source and provides hydrogen from the hydrogen fuel source into the fuel cell stack causing the hydrogen to mix with the latent oxygen in the fuel cell stack and generate a voltage. The voltage is then provided to a component of the hydrogen fuel cell-powered aircraft such that additional oxygen is introduced to the fuel stack.

10 Claims, 5 Drawing Sheets

(56) References Cited

U.S. PATENT DOCUMENTS

| | | | |
|---|---|---|---|
| 2011/0045370 A1* | 2/2011 | Westenberger | B64D 41/00 |
| | | | 244/58 |
| 2018/0342747 A1 | 11/2018 | Kim | |
| 2021/0151783 A1 | 5/2021 | Miftakhov | |

OTHER PUBLICATIONS

International Search Report issued in Application No. PCT/US2022/023712, mailed on Dec. 16, 2022 (7 pages).
Written Opinion issued in Application No. PCT/US2022/023712, mailed on Dec. 16, 2022 (7 pages).

* cited by examiner

JUMP-STARTING A HYDROGEN FUEL CELL-POWERED AIRCRAFT

CROSS-REFERENCE TO RELATED APPLICATIONS (PROVISIONAL)

This application claims priority to and benefit of U.S. Provisional Patent Application No. 63/171,697 filed on Apr. 7, 2021, entitled "METHODS OF JUMP-STARTING A HYDROGEN FUEL CELL-POWERED AIRCRAFT" by Tejpal et al., and assigned to the assignee of the present application, the disclosure of which is hereby incorporated by reference in its entirety.

FIELD OF THE INVENTION

Embodiments of the present technology relate generally to hydrogen fuel cell-powered aircraft, and more particularly, to jump-starting a hydrogen fuel cell of a hydrogen fuel cell-powered aircraft.

BACKGROUND

Starting a hydrogen fuel cell requires an initial input of energy much like a combustion engine requires a spark provided by an ignition. However, hydrogen fuel cells require a high voltage to start, which is often in the form of a bulky and heavy high-voltage starter battery. Other means for starting a hydrogen fuel cell of a hydrogen fuel cell-powered aircraft are needed.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Hydrogen-electric engine systems are disclosed herein as an example use of the system for fuel cell management. However, it should be appreciated that in another embodiment, other systems with different types of fuel cells may be used in conjunction with or in place of one or more of the Hydrogen and/or electric engine systems.

Figure 1:
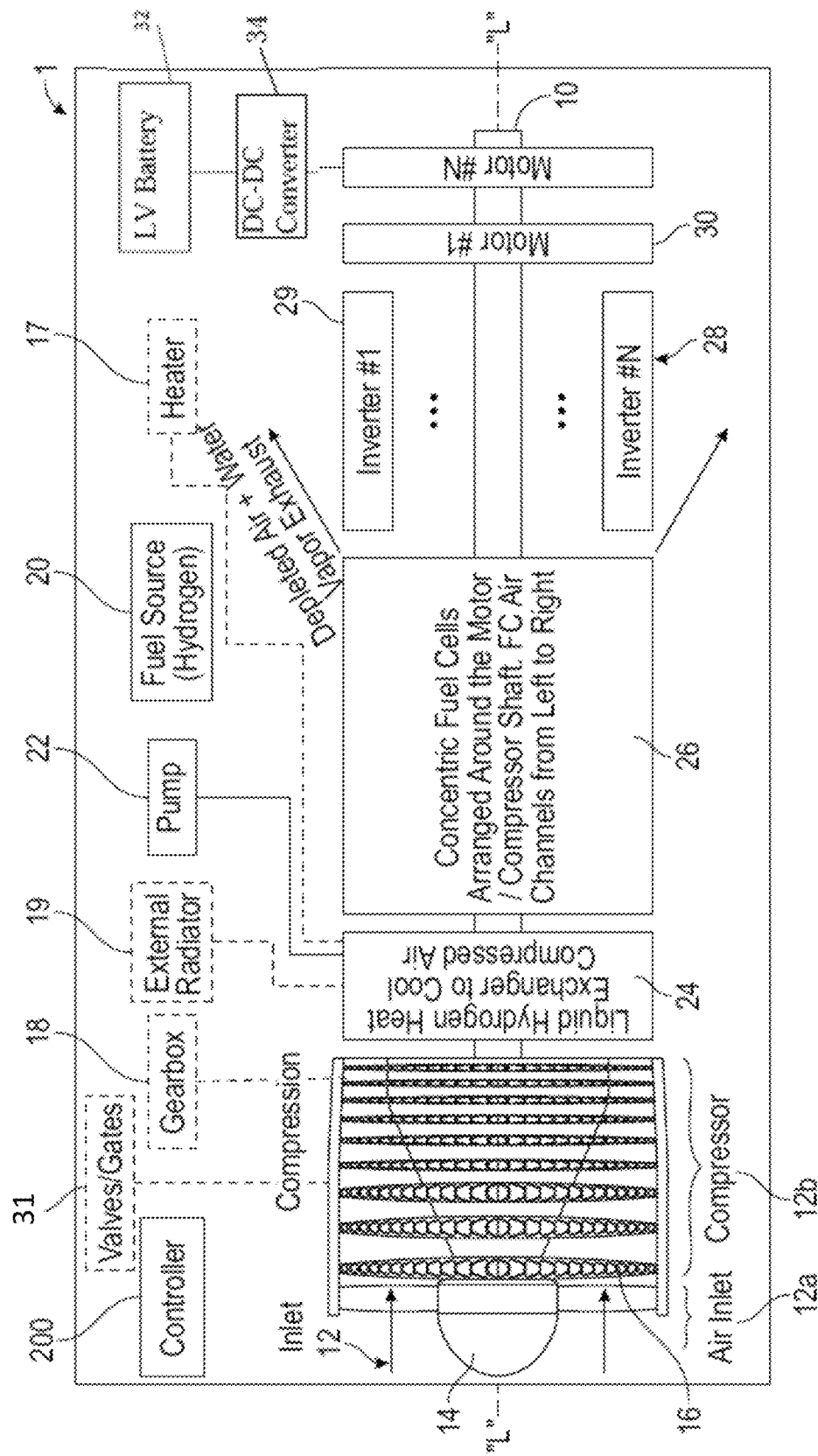
FIG. 1 is a schematic view of an integrated hydrogen-electric engine system, in accordance with an embodiment.

With reference now to FIG. 1, a block diagram of an integrated hydrogen-electric engine system 1 is shown in accordance with one embodiment. In one embodiment, integrated hydrogen-electric engine system 1 is utilized, for example, in a turboprop or turbofan system, to provide a streamlined, lightweight, power-dense, and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly 30 disposed in electrical communication with the fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy.

In one embodiment, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 31 to regulate the pressure and flow of the air that enters the downstream fuel cell stack 26, as well as to manage the cold air supply to any auxiliary heat exchangers in the system.

Compressor system 12 can optionally be mechanically coupled with elongated shaft 10 via a gearbox 18 to change (increase and/or decrease) compressor turbine rotations per minute (RPM) and to change the airflow to fuel cell stack 26. For instance, gearbox 18 can be configured to enable the airflow, or portions thereof, to be exhausted for controlling a rate of airflow through the fuel cell stack 26, and thus, the output power.

Integrated hydrogen-electric engine system 1 further includes a gas management system such as a heat exchanger 24 disposed concentrically about elongated shaft 10 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen (LH2), or cold hydrogen gas) that is operatively coupled with heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system.

In one embodiment, the hydrogen gas is heated in the heat exchanger 24 to a working temperature of the fuel cell stack 26, which also takes heat out of the compressed air, which results in control of flow through the heat exchanger 24. In one embodiment, a heater 17 can be coupled with or included with heat exchanger 24 to increase the heat as necessary, for instance, when running under a low power regime. Additionally, and/or alternatively, motor assembly 28 can be coupled with heat exchanger 24 for looping in the cooling/heating loops from motor assembly 28 as necessary. Such heating/cooling control can be managed, for instance, via controller 200 of integrated hydrogen-electric engine system 1. In one embodiment, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen. In one embodiment, integrated hydrogen-electric engine system 1 includes a low voltage battery source 32 (e.g., 12V to about 24V) and a DC-DC converter 34 in electrical communication with the low voltage battery source 32 and the motor assembly 28. In another embodiment, the DC-DC converter 34 is in electrical communication with the fuel cell stack 26.

Figure 2:
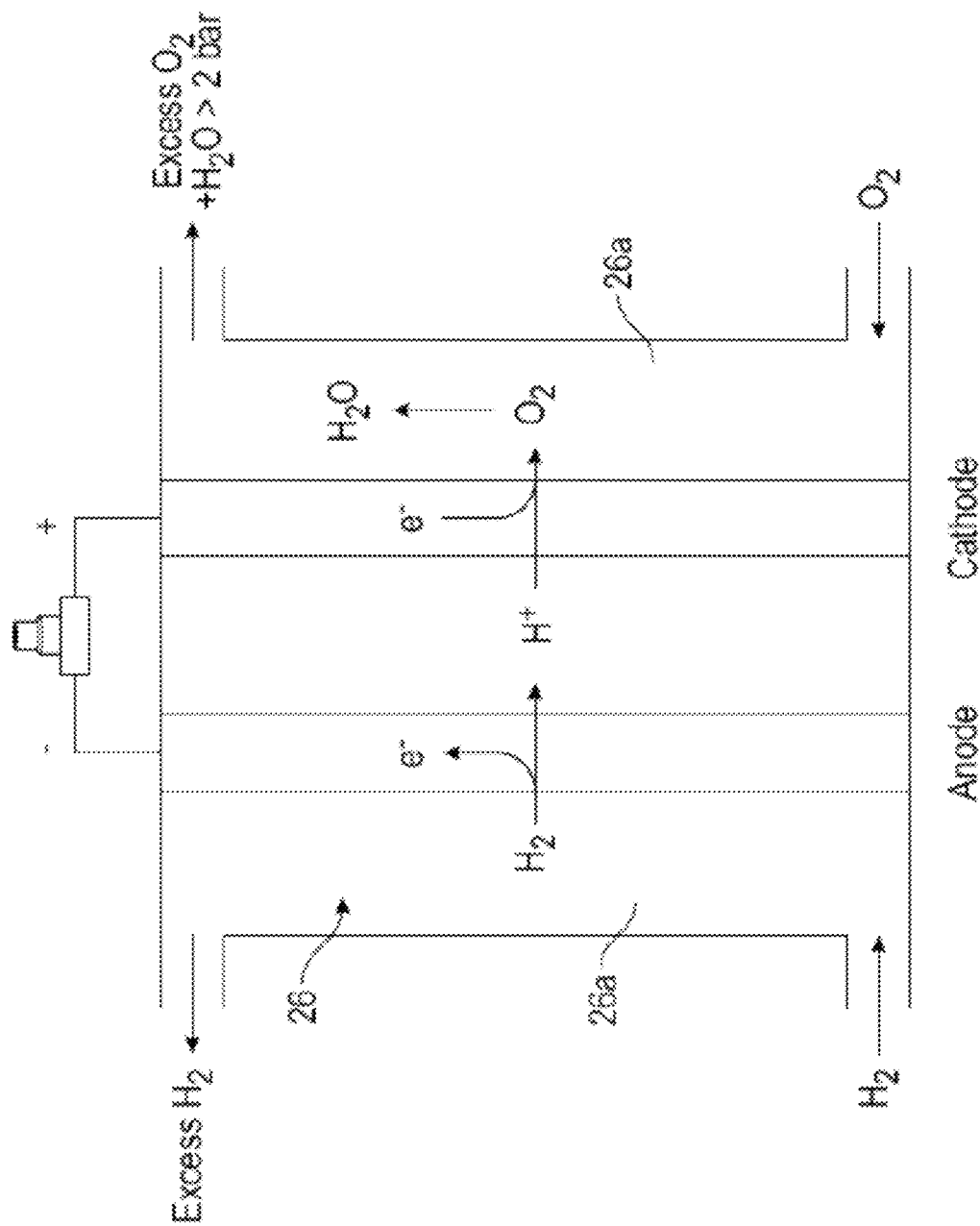
FIG. 2 is a schematic view of a fuel cell of the integrated hydrogen-electric engine system of FIG. 1, in accordance with an embodiment.

With reference also to FIG. 2, in one embodiment, integrated hydrogen-electric engine system 1 further includes an energy core in the form of a fuel cell stack 26, which is circular, and is also coaxially supported on elongated shaft 10 (e.g., concentric) such that any air channels of fuel cell stack 26 is oriented in parallel relation with elongated shaft 10 (e.g., horizontally or left-to-right). In one embodiment, fuel cell stack 26 is in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to the motor assembly, which is also coaxially/concentrically supported on elongated shaft 10.

In one embodiment, integrated hydrogen-electric engine system 1 may include any number of external radiators 19 (FIG. 1) for facilitating airflow and adding, for instance, additional cooling. Notably, fuel cell stack 26 can include liquid-cooled and/or air-cooled cell types so that cooling loads are integrated into heat exchanger 24 for reducing the total amount of external radiators needed in the system.

The motor assembly of integrated hydrogen-electric engine system 1 includes a plurality of inverters 28 and 29 configured to convert the direct current to alternating current for actuating one or more of a plurality of motors 30 in electrical communication with the inverters 28 and 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In one embodiment, one or more of the inverters 28 and 29 are disposed between motors 30 (e.g., a pair of motors) to form a motor subassembly, although any suitable arrangement of motors 30 and inverters 28 and 29 is provided. The motor assembly can include any number of motor subassemblies supported on elongated shaft 10 for redundancy and/or safety. In one embodiment, motors 30 and inverters 28 and 29 can be coupled together and positioned to share the same thermal interface so a motor casing of the motors 30 is also an inverter heat sink so only a single cooling loop goes through the motor assembly for cooling the inverters 28 and 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of the aircraft system. For instance, controller 200 can be configured to manage a flow of liquid hydrogen, manage coolant liquids from the motor assembly, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1.

In one embodiment, managing these thermal management components is designed to ensure the most efficient use of the various cooling and heating capacities of the respective gases and liquids to maximize the efficiency of the system and minimize the volume and weight of the same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
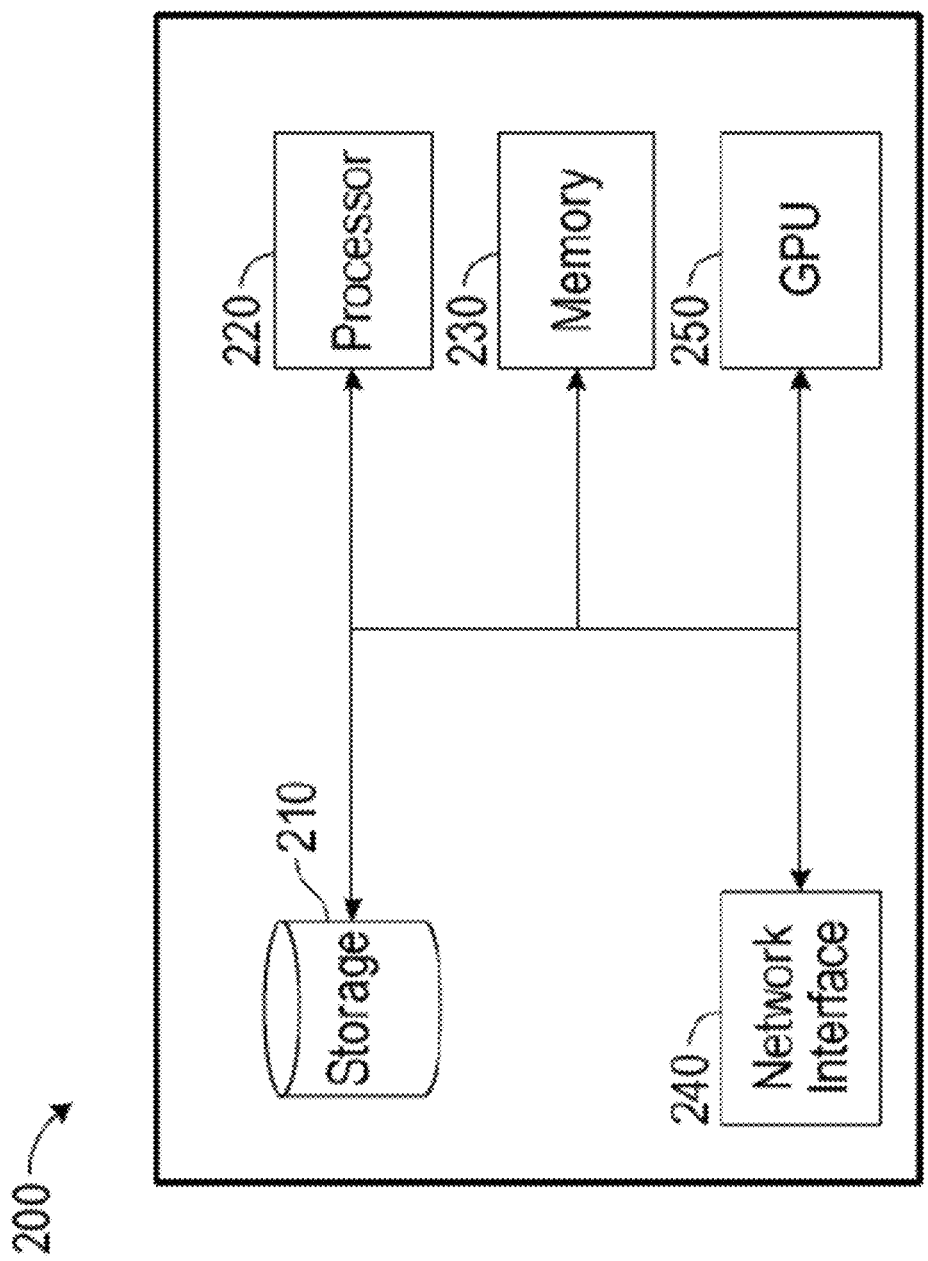
FIG. 3 is a block diagram of a controller configured for use with the integrated hydrogen-electric engine system of FIG. 1, in accordance with an embodiment.

FIG. 3 illustrates a controller 200 in accordance with an embodiment. In one embodiment controller 200 includes a processor 220 coupled with a computer-readable storage medium or a memory 230. The computer-readable storage medium or memory 230 is a volatile type of memory, e.g., RAM, or a non-volatile type memory, e.g., flash media, disk media, etc. In one embodiment, the processor 220 is another type of processor such as, without limitation, a digital signal processor, a microprocessor, an ASIC, a graphics processing unit (GPU), a field-programmable gate array (FPGA), or a central processing unit (CPU). In one embodiment, network inference may also be accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 may include a network interface 240 to communicate with other computers or to a server. A storage device 210 is used for storing data.

The disclosed method may run on the controller 200 or on a user device, including, for example, on a mobile device, an IoT device, or a server system.

In one embodiment, controller 200 is configured to receive, among other data, the fuel supply status, aircraft location, and control, among other features, the pumps, motors, sensors, etc.

In one embodiment, or in different embodiments, the integrated hydrogen-electric engine system 1 can include any number and/or type of sensors, electrical components, and/or telemetry devices that are operatively coupled with controller 200 for facilitating the control, operation, and/or input/out of the various components of integrated hydrogen-electric engine system 1 for improving efficiencies and/or determining errors and/or failures of the various components.

For a more detailed description of components of similar hydrogen-electric engine systems, one or more components of which can used or modified for use with the structure of the present disclosure, reference can be made, for example, to U.S. patent application Ser. No. 16/950,735, the entire contents of which are hereby incorporated by reference herein.

Figure 4:
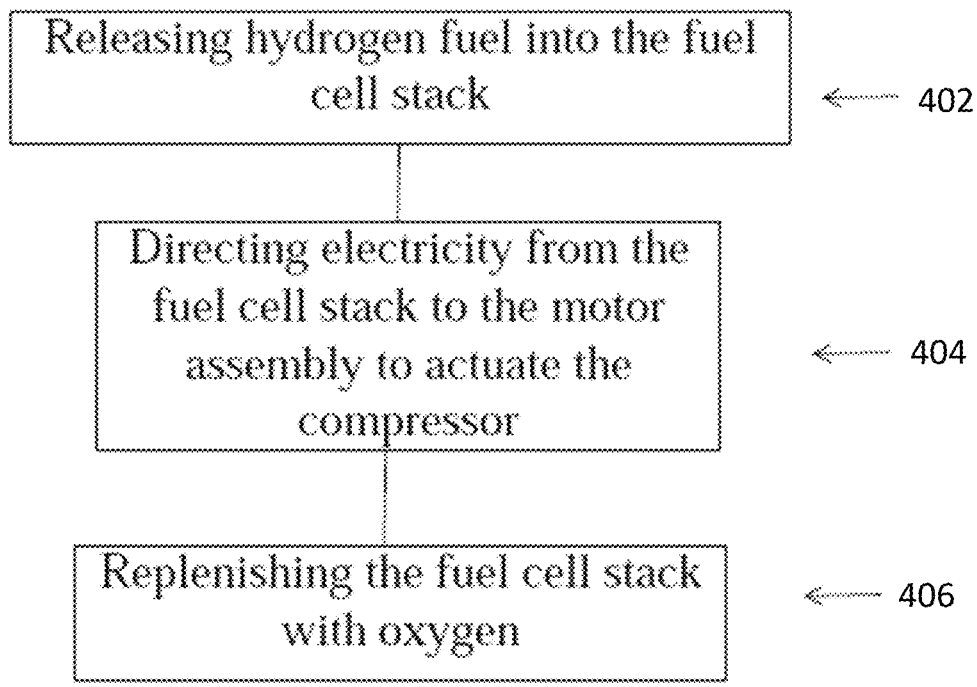
FIG. 4 is a flow chart illustrating a method of starting the fuel cell of the integrated hydrogen-electric engine system of FIG. 1, in accordance with an embodiment.

Referring now to FIG. 4, a flow chart illustrating a method of starting the fuel cell of the integrated hydrogen-electric engine system of FIG. 1 is shown in accordance with an embodiment. Although the steps of FIG. 4 are shown in a particular order in one embodiment. In another embodiment, the steps may be performed in an order different than the specified order and/or certain steps can be added or omitted.

In one embodiment, at 402, the hydrogen fuel is released from the fuel source 20 into the fuel cell stack 26, whereby the hydrogen fuel mixes with the latent oxygen remaining in the fuel cell stack 26. Since the fuel cell stack 26 requires only oxygen and hydrogen fuel to generate electricity, the mixing of the hydrogen fuel and the latent oxygen in the fuel cell stack 26 results in the fuel cell stack 26 generating a voltage.

In one embodiment, at 404, the electricity generated by the fuel cell stack 26 is directed to the motor assembly 28, whereby the motor assembly 28 rotates the elongated shaft 10, which in turn, actuates the compressor 12.

Referring now to 406, in one embodiment, the compressor 12, via the compressor wheels 16 of the compressor portion 12*b*, draws air (including oxygen) from the external environment and ultimately into the fuel cell stack 26 to replenish the fuel cell stack with oxygen. Additional hydrogen fuel is released into the fuel cell stack 26 and combined with the compressed oxygen to power the aircraft. At this stage, the fuel cell stack 26 functions as a self-charging capacitor and the integrated hydrogen-electric engine system 1 is jump-started.

Figure 5:
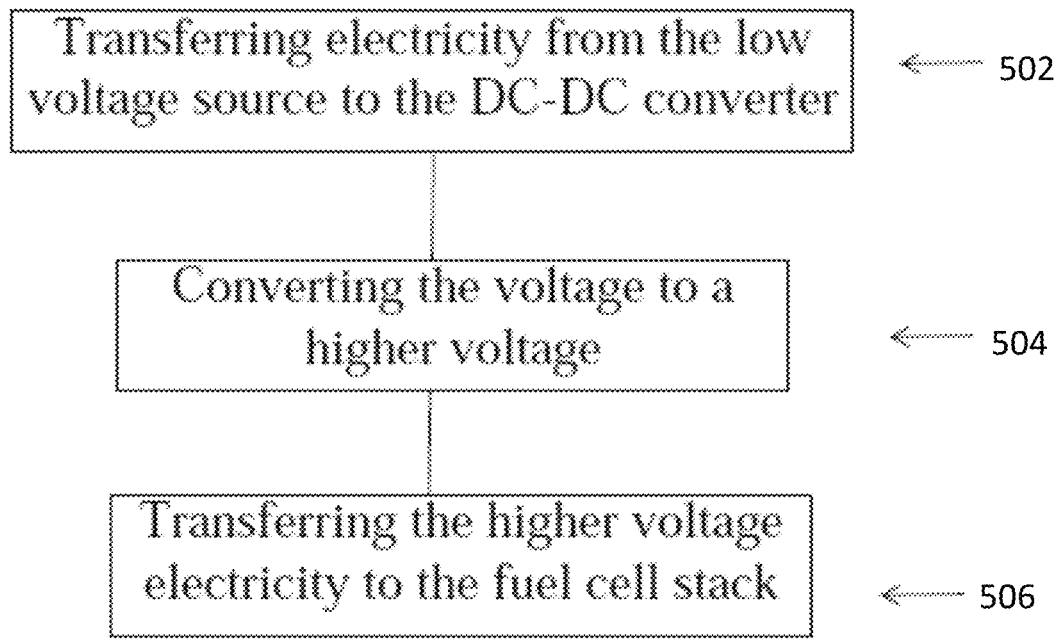
FIG. 5 is a flow chart illustrating another method of starting the fuel cell of the integrated hydrogen-electric engine system of FIG. 1, in accordance with an embodiment.

FIG. 5 is a flow chart illustrating another method of starting the fuel cell of the integrated hydrogen-electric engine system of FIG. 1 is shown in accordance with an embodiment. Although the steps of FIG. 4 are shown in a particular order in one embodiment. In another embodiment, the steps may be performed in an order different than the specified order and/or certain steps can be added or omitted.

At 502, another embodiment for starting the integrated hydrogen-electric engine system includes transferring electricity from the low voltage battery 32 (FIG. 1) to the DC-DC converter 34.

At 504, the DC-DC converter 34 converts a voltage (e.g., from about 12V to about 24V) of the electricity from the low voltage battery 32 to a higher voltage (e.g., from about 12 kW to about 15 kW). I At 506, the higher voltage electricity is transferred from the DC-DC converter 34 to the fuel cell stack 26. In one embodiment, the transfer of the higher voltage electricity from the fuel cell stack 26 to the motor assembly 28 actuates the compressor 12 to draw oxygen into the fuel cell stack 26. Hydrogen fuel is then released from the fuel source 20 into the fuel cell stack 26 as the oxygen is drawn into the fuel cell stack 26, whereby the fuel cell stack 26 is started and may continue to produce electricity to power the aircraft. In one embodiment, the DC-DC converter 34 may transfer the high voltage electricity directly to the motor assembly 28. In one embodiment, the low voltage power source is an electrical bus or other suitable component of the balance of plant.

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which may include or be coupled with one or more printed circuit boards. As appreciated, the disclosed computing devices and/or server can include, for example, a "controller," "processor," "digital processing device" and like terms, and which are used to indicate a microprocessor or central processing unit (CPU).

In one embodiment, the CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" is used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller may include a wireless network interface to communicate with other computers or a server. In one embodiment, a storage device is used for storing data. In one embodiment, the processor is, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller is remote from the disclosed structure (e.g., on a remote server), and accessible by the disclosed structure via a wired or wireless connection. In one embodiment where the controller is remote, it is accessible by, and coupled with, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled with a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled with a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all coupled with each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

As used herein, the controller includes software modules for managing various functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PLi, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The present technology is described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of jump-starting a hydrogen fuel cell-powered aircraft, said method comprising:

accessing a fuel cell stack containing latent oxygen therein;
   accessing a hydrogen fuel source;
   providing hydrogen from said hydrogen fuel source into said fuel cell stack;
   causing said hydrogen to mix with said latent oxygen in said fuel cell stack and generate a voltage; and
   providing said voltage to a motor assembly of said hydrogen fuel cell-powered aircraft to cause said motor assembly to rotate an elongated shaft having a compressor operably coupled to the elongated shaft, wherein the compressor is rotated to introduce additional oxygen into said fuel cell stack.

2. The method of claim 1, further comprising:
   providing said voltage to a compressor of said hydrogen fuel cell-powered aircraft; and
   operating said compressor with said voltage generated by said fuel cell stack.

3. The method of claim 2, further comprising:
   utilizing said operating compressor to provide oxygen to said fuel cell stack.

4. The method of claim 1, further comprising:
   utilizing said operating motor assembly for operating the compressor of said hydrogen fuel cell-powered aircraft.

5. A system comprising:
   a fuel cell stack containing latent oxygen therein;
   a hydrogen fuel source;
   a controller to provide hydrogen from said hydrogen fuel source into said fuel cell stack and cause said hydrogen to mix with said latent oxygen in said fuel cell stack to generate a voltage; and
   a motor assembly of a hydrogen fuel cell-powered aircraft to receive said voltage, wherein said voltage causes said motor assembly to rotate an elongated shaft having a compressor operably coupled to the elongated shaft, wherein the compressor is rotated to introduce additional oxygen into said fuel cell stack.

6. The system of claim 5, wherein said compressor of said hydrogen fuel cell-powered aircraft receives said voltage.

7. The system of claim 6, further comprising:
   said compressor to operate upon receipt of said voltage and provide oxygen to said fuel cell stack.

8. The method of claim 1, further comprising heating said hydrogen provided into said fuel cell stack with a heater.

9. The method of claim 1, further comprising heating said hydrogen provided into said fuel cell stack with a heat exchanger, said heat exchanger coupled with said motor assembly and a heater.

10. The system of claim 5, further comprising a heater to heat said hydrogen provided into said fuel cell stack.

* * * * *